United States Patent Office 3,358,356
Patented Dec. 19, 1967

3,358,356
METHOD FOR EXOTHERMIC BRAZING OF METAL JOINTS
Roger A. Long, San Diego, Calif., assignor to Whittaker Corporation, Los Angeles, Calif., a corporation of California
No Drawing. Filed Sept. 15, 1966, Ser. No. 579,477
7 Claims. (Cl. 29—498.5)

This application is a continuation-in-part of Ser. No. 229,978, filed Oct. 11, 1962, now abandoned, which application was a continuation-in-part of Ser. No. 686,870, filed Sept. 30, 1957, now abandoned, the disclosures of which are expressly incorporated herein by reference.

This invention relates to a method of exothermic brazing of metal structures.

The principal object of this invention is to produce, by a new technique utilizing reactive metal compounds and combinations thereof, suitable brazed joints equivalent to those produced by the conventional methods of brazing.

A further object of this invention is to provide, and apply on joints to be welded, a series of materials such as metals, alloy compounds and the like, in combinations or in mixtures which, when heated to relatively low temperatures, react or dissociate with the evolution of heat at a sufficient temperature and in a sufficient amount to cause melting and flowing of a brazing material of a desired composition, which brazing material may be an alloy formed by a part of the metal of the composition. One alloy originally included in an intimate relationship to the metal compounds dissociating or reacting with an evolution of heat. The novel brazing concepts disclosed herein may be utilized in various ways. However, the brazing method to which this patent is directed comprises brazing two metal surfaces together by pre-placing at the metal surfaces a brazing material having a melting point lower than that of the metal which forms the surfaces and higher than 900° F., pre-placing adjacent to, and in heat transfer relation to and physically separated by a solid barrier from, the brazing material, solid reactant materials which are selected from the group consisting of those which, when heated to a temperature below the brazing material would react with each other and evolve, by an oxide reduction process wherein no gaseous oxygen is evolved, heat at sufficient temperature in a sufficient amount to melt and flow the brazing material, which reactant materials, when reacting are non-gas forming, and then heating the materials to said low temperature to initiate said reaction, and then maintaining the physical separation of the reactant materials and brazing materials throughout the entire reaction, said barrier comprising one of said metallic surfaces.

The method is based on the following factors:

The ability of metal compounds to react and/or dissociate with an evolution of heat.

The utilization of this heat to heat the surrounding metal structure of the area to be joined.

The producing where necessary of a protective gas for the duration of the brazing cycle, or during the necessary portion of the brazing cycle, to protect the easily oxidizable metals in the structure being joined or in the brazing alloy supplemented, if desired, by vacuum or outside introduction of inert or reducing gases.

The utilization of reaction heat to cause a melting of brazing alloy components of the metal compound or mixtures or to cause a melting of the brazing alloy placed in intimate relationship to the heating source compounds.

The formation of a residue which is not detrimental to the application of the finished fabricated product such as being non-corrosive to the metal of the structure and/or the flow braze alloy.

The formation of gaseous components which minimize the residue formation.

As a part of the procedure wherein a protective gas is produced, the choice of metal compound components is such that the protective gas is dissociated prior to the large heat evolution and is timed to provide protection prior to, and at the moment of, brazing alloy flow and solidification.

The above process has the following advantages over present methods:
(a) The cycle is faster and, therefore, braze alloy penetration is low and costs are low.
(b) No large and costly furnace equipment is required and, instead, brazing can be accomplished on heated tables, platen presses or autoclaves with a minimum of tooling.
(c) Distortion of the final product is minimized because of the short heat cycle and the use of low cost restraining fixtures.
(d) Pre-placing of brazing alloys can be simplified.
(e) The process is applicable to low melting braze alloys as well as high melting braze alloys.
(f) The cost of brazing alloy is low, as exact properties can be determined and excesses minimized.
(g) Heating costs and atmospheric gas costs are almost non-existent when compared to conventional procedures.

In order to accomplish the first objective of this invention, it was necessary to develop and utilize metal reacting compounds which, when heated to some low temperature, react and/or dissociate with exothermic release of heat. It is necessary that these compounds have the following characteristics:
(a) They must initiate an exothermic reaction or dissociate at a temperature less than the melting point temperature of the brazing alloy.
(b) The heat given off must be sustained for a required minimum time period, this requirement varying according to the metal mass of the components being joined.
(c) One of the components dissociated should be a gas such as hydrogen, nitrogen, halogen, etc.
(d) The residue remaining from the reaction should be minimum and preferably should have non-corrosive characteristics.

Since the process is particularly useful for very thin metal, it is illustrated using, as an example, stainless steel honeycomb in which the core is 0.002 inch thick and the skins are 0.003–0.005 inch thick.

The core and the skins are cleaned by standard procedures to the cleanliness required for normal brazing methods.

The components are assembled except for the one outer skin and the brazing alloy reaction powder mixture is distributed evenly in the cells of the core. The outer skin is then placed.

The assembly is placed in restraining fixtures or in vacuum blankets to maintain desired shape.

Assuming the temperature for initiating the action is 600° F., the assembly is placed between platens which are heated, or in an autoclave, and the entire assembly heated to the reaction temperature. Exothermic heat causes the brazing alloy to flow. Silver-copper-lithium melts and flows at about 15–1700° F. The exothermic heat must be such as to sustain an average of this temperature through the portions to be brazed of each individual cell unit, and give enough heat input to melt the braze alloy.

The assembly is then removed from the fixture, platen, etc., and inspected for continuity of bond. Alternatives to the above procedure are pre-placing brazing alloys separate from the reaction mixture, pre-placing brazing alloy-reaction mixture on the core adjacent to the joint to be made by the use of adhesive organic compounds; utilizing a vacuum or introducing a protective gas into the assembly; and utilizing alternate methods of heating to the initial reaction tempearture.

As will be apparent to those skilled in the art from what I have already said, the procedure for preplacing the brazing alloy separate from the reaction mixture in the brazing of skins to honeycomb cores involves the utilization of one of the metallic surfaces being joined as a barrier between the exothermic reactant materials and the brazing materials throughout the entire reaction. This may be carried out in one way by cleaning the core and skins as described above. The components are assembled with the brazing alloy in the form of a thin foil, for example, positioned in the cells of the core. The outer skins are then placed against the core and the outer surface of the skins coated with the exothermic material. For example, the exterior surface of the skins may be coated with a slurry layer of a mixture of 5 parts vanadium pentoxide and 1 part boron metal. The exothermic material may then be dried, which process may be facilitated by the use of heat such as from an infra-red lamp. The density of the exothermic material on the outer surface of the skins is not critical and must simply be sufficient to produce enough heat to melt the metallic material and cause the same to flow. The particular amount utilized in any instance may be readily determined by those skilled in the art by routine experimentation. The assembly is then placed in a restraining fixture or vacuum blanket heated to melt the braze alloy and then removed from the fixture, platen and the like as indicated above.

Optionally, there may be placed between the outer surfaces of the skin and the exothermic material a thin slip sheet such as 10 mil thick copper sheet or 6 mil thick stainless steel sheet.

An example of the chemical operation of the present invention is as fololws:

(1) $Cu_2O$ and $Ag_2O$ were mixed in the relation to obtain an eutectic of 72% Ag and 28% Cu which has a melting point of 1436° F. In order to initiate a reaction and a reduction of the metal oxide lithium hydride was used as the reducing agent.

(2) The powders, —325 mesh were intimately mixed, (a stoichiometric excess sufficient to reduce the $Cu_2O$ and $Ag_2O$ of lithium hydride added) and placed in a crucible. Ignition occurred by heating the crucible to below red heat (1000° F.). The temperature immediately increased to at least 2600° F. for approximately 1 to 2 seconds.

Results: Beads of eutectic copper-silver ranging up to $\frac{1}{16}$ inch diameter were formed Additional similar tests indicated ignition temperatures of less than 600° F.

Typical formula for this reaction is:

$Ax+y=xy+A$ and heat; where $A$ is the metal or alloy desired to be formed, $x$ is a non-metallic element or radical, and $y$ is the reaction or reducing element.

It is vitally important in the above process that choice of the correct elements and compounds be made. Separation of the desired alloy from the reaction products must be complete at the temperatures encountered in order to maintain braze alloy strength.

The following examples are given of typical reactions:

(a) $(Cu_2O+Ag_2O)+2Ca \rightarrow 2CuAg+2CaO$
(b) $(Cu_2O+Ag_2O)+2Mg \rightarrow 2CuAg+2MgO$
(c) $(Cu_2O+Ag_2O)+Mg \rightarrow 2CuAg+2CuAg+2MgO_2$
(d) $(CuAg)O_2+4LiH \rightarrow 2Li_2O+2AgCu+2H_2$
(e) $(NiO+MnO)+2Ca \rightarrow NiMn+2CaO$
(f) $(NiO+MnO)+4LiH \rightarrow 2Li_2O+NiMn+2H_2$
(g) $(Ag_2O+MnO)+4LiH \rightarrow 2Li_2O+(2Ag,MN)+2H_2$ The number of combinations with final end results are numerous.

The use of hydrides and alloy hydride combinations appear to be the most desirable as a gas product is formed and hydrogen acts as a metal cleaning agent at temperatures over 1700° F.

Utilizing the hydride process, brazing alloy compounds can be produced which can later be reacted to eliminate the non-metallic element and create heat. The higher the heat of reaction the greater the separation of the resultant components. This is particularly desirable for the brazing application where one of the components is a liquid.

In addition to using compounds containing brazing alloy elements or brazing compounds, the use of brazing alloy in its commercially available base form and the use of reaction compounds just to produce heat is satisfactory and in some cases gives better results. An example is as follows:

(1) Commercially available silver-copper eutectic in foil form is placed in the joint to be brazed, such as in the stainless steel honeycomb structure, between the cells and the face plates.

(2) A mixture of NiO and calcium or lithium hydride in correct reacting proportions is added to the cells.

(3) Heating to reaction temperature causes an exothermic reaction to start at about 500° F. which increases the temperature to about 3000° F. for a duration of one to two seconds. This is sufficient to melt the brazing alloy and bond the cells to the skin.

This example shows the technique which can be used utilizing commercially available brazing alloy.

The selection of the reducing agent or the reacting agent, if no oxide or halide reduction is involved, generally, for ease of handling, consists of a reacting element in the form of a hydride. This is not necessary but very desirable. The elements which have been used are calcium, magnesium, zirconium, lithium, barium, aluminum, manganese and sodium. The alternate to a reducing reaction is the heat formed by reactions which give off heat, such as in the formation of inter-metallic metal compounds. The oxide or halide reduction is preferred.

It is necessary in most cases to prolong the heat of reaction to permit heating of the adjoining metal structure which is to be brazed.

This can be accomplished by selection of proportions, by selection of the elements and compounds reacting, by introducing a relatively inert compound to the mixture, and by changing particle sizes of the reacting components.

A higher heat of reaction can be obtained by further reacting the excessive amount of the reducing agent by an additional oxidizer. This supplements the heat and also increases the time period slightly.

It is apparent from the foregoing that the results may be obtained by applying to the metal pieces to be joined either a single composition containing both the brazing and reacting or dissociating components, or by applying to the metal pieces a brazing material in a commercially available form of sheets or powder and applying thereover or therewith a composition which is to react or dissociate to evolve the heat.

It is also apparent from the foregoing disclosure and examples that specific proportions of ingredients vary widely depending upon the type of brazed joint desired, and since the metal pieces to be brazed together, the material to be used as a braze, and the type of joint, each may be varied considerably in accordance with industrial needs, that specific relations rather than specific ingredients and arithmetical proportions thereof are controlling. The primary ones of these relations are that the braze material must be suitable for the particular pieces and joints desired; that the reactive or dissociative components should be capable of evolving heat to a sufficient temperature for effecting the melting and flow of the braze material, either as originally included or as formed by alloying of materials during the heat of reaction or dissociation, and that the reactive or dissociative components should be present in relation to the braze material in sufficient quantity to melt all of the braze material desired, and, where necessary, to heat the metal pieces to a desirable temperature for the brazing operation; that a protective agent or gas for the particular pieces and hot braze material be provided.

Further, it is apparent that by the use of the present methods, the expensive furnaces and equipment heretofore required for brazing and handling articles of substantial size are unnecessary. Instead of such furnaces and the like, all that is required is very simple equipment and ample table or floor space on which to support the articles during brazing.

The method is found particularly useful for joining honeycomb structures of thin stainless steel, aluminum, and titanium, in which the honeycomb elements have a thickness usually ranging downwardly from .003 inch thickness as a maximum and in which the skin sheets or metal have a usual thickness ranging downwardly from about .015 inch maximum.

Having fully described the invention, it is to be understood that this invention is not to be limited to the illustrations and examples set forth, but is of the full scope of the appended claims.

I claim:

1. The method of brazing two metal surfaces together which comprises pre-placing at the metal surfaces a brazing material having a melting point lower than that of the metal which forms the surfaces and higher than 900° F., selected from the group consisting of non-ferrous metals and alloys thereof, pre-placing adjacent to, and in heat transfer relation to, and physically separated by, a solid barrier from, the brazing material, solid reactant materials which are from the group consisting of those which, when heated to a temperature below the brazing temperature react with each other and evolve, by an oxide reduction process wherein no gaseous oxygen is evolved, said materials being a mixture selected from the group consisting of at least one metal oxide and at least one material taken from the group consisting of metals and metal hydrides, heat at sufficient temperature and in sufficient amount to melt and flow the brazing material, which reactant materials, when reacting are non-gas forming, and then heating the materials to said low temperature to initiate said reaction, and then maintaining the physical separation of the reactant materials and brazing material throughout the entire reaction said barrier comprising one of said two metal surfaces.

2. The method according to claim 1 characterized in that said brazing material is foil.

3. The method of joining metallic surfaces which comprises applying at the surfaces a sheet of brazing material having a melting point lower than that of the metal which forms the surfaces and higher than 900° F., selected from the group consisting of non-ferrous metals and alloys thereof, and applying thereover, in heat transferring relation thereto and physically separated therefrom by a solid barrier, solid reactant materials which are from the group consisting of those materials which, when heated to a temperature below the brazing temperature, react and evolve by an oxide reduction process wherein no gaseous oxygen is evolved, said materials being a mixture selected from the group consisting of at least one metal oxide and at least one material taken from the group consisting of metals and metal hydrides, heat at sufficient temperature and in sufficient amount to melt and flow the brazed material, and which reactant materials, when reacting are nongas forming, heating the materials to said low temperature to initiate the reaction, and then maintaining a physical separation of the reactant materials and brazing material throughout the entire reduction, and permitting the reaction to continue to completion, said barrier comprising one of said metallic surfaces.

4. The method according to claim 1 wherein the reactant materials and brazing material are non-reactant with respect to each other.

5. The method of uniting two metal pieces, each metal piece having a melting point higher than 900° F., comprising: placing at the joint of said metal pieces a metallic material, said material being selected from the group consisting of nonferrous metals and metal alloys having melting points lower than either metal piece and higher than 900° F., melting said metallic material by exposing the same to a heat source which is maintained in spaced relationship with respect to said metallic material by a solid barrier, said heat source being a chemical composition comprising a mixture of a metallic oxide and a metallic hydride, which mixture, when heated to a temperature below the melting point of said metallic material, reacts exothermically to produce heat in sufficient quantity and amount to melt said metallic material and cause the same to flow; heating said chemical composition to a temperature below the melting point of said metallic material; and allowing said metallic material to cool whereby said metal pieces are united, said barrier comprising one of said metal pieces.

6. The method of uniting two ferrous metal pieces comprising: placing at the joint of said metal pieces a metallic material selected from the group consisting of copper, copper alloys, silver alloys and aluminum alloys; melting said metallic material by exposing the same to a heat source which is maintained in spaced relationship with respect to said metallic material by a solid barrier, said heat source being a chemical composition comprising a mixture of a metallic oxide and a metallic hydride, which mixture, when heated to a temperature below the melting point of said metallic material, reacts exothermically to produce heat in sufficient quantity and amount to melt said metallic material and cause the same to flow; heating said chemical composition to a temperature below the melting point of said metallic material; and allowing said metallic material to cool whereby said metal pieces are united, said barrier comprising one of said metal pieces.

7. The method of uniting two ferrous metal pieces comprising: placing at the joint of said metal pieces a silver-copper eutectic foil; melting said foil by exposing the same to a heat source which is maintained in spaced relationship with respect to said foil by a solid barrier, said heat source being a chemical composition comprising a mixture of nickel oxide and lithium hydride, which mixture, when heated to a temperature below the melting point of said foil, reacts exothermically to produce heat in sufficient quantity and amount to melt said foil and cause the same to flow; heating said chemical composition to a temperature below the melting point of said metallic material; and allowing said foil material to cool whereby said metal pieces are united, said barrier comprising one of said metal pieces.

References Cited

UNITED STATES PATENTS

| Re. 13,219 | 3/1911 | Chapman | 29—498.5 |
| 1,813,904 | 7/1931 | Brunhubner | 29—496 |
| 2,569,956 | 10/1951 | Schiltknecht | 75—27 |
| 2,807,082 | 9/1957 | Zambron et al. | 29—504 |
| 3,107,421 | 10/1963 | Turndull | 29—474.4 |
| 3,308,532 | 3/1967 | Long et al. | 228—56 |

FOREIGN PATENTS

| 415,181 | 8/1934 | Great Britain. |
| 544,888 | 10/1941 | Great Britain. |

JOHN F. CAMPBELL, *Primary Examiner.*

P. M. COHEN, *Assistant Examiner.*